(12) United States Patent
Ku

(10) Patent No.: US 6,691,179 B2
(45) Date of Patent: Feb. 10, 2004

(54) DIRECT MEMORY ACCESS CONTROLLER FOR CONVERTING A TRANSFER MODE FLEXIBLY IN ACCORDANCE WITH A DATA TRANSFER COUNTER VALUE

(75) Inventor: Yong-Guen Ku, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 332 days.

(21) Appl. No.: 09/956,534

(22) Filed: Sep. 19, 2001

(65) Prior Publication Data

US 2002/0133645 A1 Sep. 19, 2002

(30) Foreign Application Priority Data

Mar. 16, 2001 (KR) .......................................... 2001-13620

(51) Int. Cl.[7] .............................................. G06F 13/28
(52) U.S. Cl. ......................................... 710/22; 710/35
(58) Field of Search ............................. 710/22, 23, 35, 710/28, 308, 309

(56) References Cited

U.S. PATENT DOCUMENTS

| | | | | |
|---|---|---|---|---|
| 4,530,053 A | * | 7/1985 | Kriz et al. ..................... 710/22 |
| 4,799,199 A | * | 1/1989 | Scales et al. .......... 365/230.08 |
| 5,513,374 A | | 4/1996 | Baji ............................ 395/846 |
| 5,590,286 A | | 12/1996 | Mehring et al. ............. 395/250 |
| 5,613,162 A | | 3/1997 | Kabenjian .................... 395/842 |
| 5,669,014 A | | 9/1997 | Iyengar et al. .............. 395/842 |
| 6,070,210 A | * | 5/2000 | Cheon ........................ 710/105 |

* cited by examiner

*Primary Examiner*—Kim Huynh
(74) *Attorney, Agent, or Firm*—Mills & Onello, LLP

(57) ABSTRACT

A DMA controller includes a burst/single mode control circuit for automatically converting a DMA transfer operation mode to a burst mode and/or a single mode regardless of a data transfer counter value, and for performing the DMA transfer operation. The burst/single mode control circuit carries out the burst mode DMA transfer operation without the need for a control operation of the CPU a number of times corresponding to a quotient which is the result that the data transfer counter value divided by the burst length, and carries out successively the single mode DMA transfer operation by the number of times corresponding to the remainder of the division.

8 Claims, 5 Drawing Sheets

DIRECT MEMORY ACCESS CONTROLLER FOR CONVERTING A TRANSFER MODE FLEXIBLY IN ACCORDANCE WITH A DATA TRANSFER COUNTER VALUE

This application relies for priority upon Korean Patent Application No. 2001-13620, filed on Mar. 16, 2001, the contents of which are herein incorporated by reference in their entirety.

FIELD OF THE INVENTION

The present invention relates to the field of a direct memory access (DMA) transfer system, and more particularly to a device for high-speed data transfer in a DMA controller.

BACKGROUND OF THE INVENTION

A direct memory access (to be referred to as DMA hereinafter) transfer system is one of the data transfer methods carried out directly between a main memory and an input/output device without the need for control operation by a central processing unit (CPU). In the DMA transfer system, during process of input/output command signals by the CPU, the data is directly transmitted to an associated device through the input/output device.

It is necessary to add a system bus to a DMA module such as DMA controller to accommodate the DMA transfer system. The DMA controller processes some of the functions related to system control operation, rather than the CPU. In order perform this operation, when a data block is in need of being written therein or being read therefrom, the CPU supplies command signals to the DMA controller, where the command signals include information for a designation of write-in/read-out operation, an address of the input/output device, an initial address for writing/reading data from memory cells in a memory device, and the number of words to be written in or read out. After providing command signals, the CPU continues to process other, unrelated, operations, such that the DMA controller, and not the CPU, carries out the input/output operations. The DMA controller directly transmits entire data blocks word by word, without the need for control operation by the CPU. When data transfer operation is completed, the DMA module provides an interrupt signal to the CPU, to inform the CPU of the completion of data transfer. IN this manner, the CPU is needed only at the beginning and end of data transfer. The DMA transfer method is disclosed in U.S. Pat. Nos. 5,669,014; 5,613,162; 5,590,286; 5,513,374.

As well known to this art, DMA transfer generally includes two modes of DMA transfer, single mode and burst mode. If a precedence interrupt is generated, the single mode first performs the interrupt operation, and then transmits data. In contrast, the burst mode transmits data completely without being interrupted during the transfer operation of an entire data block. Transfer capacity of the system bus of the DMA controller thus depends on the application of the burst mode. Contemporary DMA controllers generally apply the burst mode, and are operable with various sizes of transmitted data (e.g. byte, half-word, and a word) and various burst lengths (e.g. 4, 8, and 16 length).

However, the burst mode is operable only in a case where the data transfer counter value can be evenly divided by the burst length, that is, without a remainder. As a result, in the case that the data transfer counter value cannot be completely divided by the burst length, there is a problem of functional limit that the DMA controller cannot be operable with the burst mode. To solve this problem, the burst mode is applied by programming data transfer counter value previously calculated. However, it is troublesome that programmers have to calculate the data transfer counter value in advance, and to program by each data length.

SUMMARY OF THE INVENTION

The object of the present invention is to provide a device capable of improving data transfer speed by converting a DMA transfer operation mode to a burst mode and/or a single mode automatically regardless of the data transfer counter value.

According to the present invention, a direct memory access controller (DMA) includes a system bus interface, first to fourth registers, a register control circuit, and a burst/single mode control circuit. The system bus interface carries out interfacing with an address of an input/output device, an address for writing/reading data from memory cells in a memory device, the data transfer counter value to be written in/read out therefrom, and control signal for a DMA transfer operation. The first register stores the address of the input/output device, the second register stores the initial address of the data to be written in/read out from the memory cell, the third register stores the data transfer counter value, and the fourth register stores the control signal. The register control circuit loads the addresses, the data transfer counter value, and the control signal from the system bus interface on the first to fourth registers. Further, the burst/single mode control circuit receives the data transfer counter value and the control signal from the third and fourth registers, and automatically converts a DMA transfer operation mode to a burst mode or a single mode, and then performs the DMA transfer operation in accordance with the converted DMA transfer operation mode.

In a preferred embodiment, the burst/single mode control circuit carries out the burst mode DMA transfer operation a number of times corresponding to a quotient which is the result that the data transfer counter value divided by the burst length, and also carries out the single mode DMA transfer operation a number of times corresponding to the remainder of the division.

The burst mode and single mode DMA transfer operations are successively carried out by the burst/single mode control circuit without the need for intervening control operations by the CPU.

BRIEF DESCRIPTION OF THE DRAWINGS

The present invention will be more clearly understood from the following description with reference to the accompanying drawings, wherein.

DETAILED DESCRIPTION OF PREFERRED EMBODIMENTS

Referring to FIGS. 1 to 5, a preferred embodiment of the present invention will be described below.

A DMA controller in accordance with the present invention transmits data by automatically converting a burst mode and a single mode regardless of a data transfer counter value, and carries out an optimum high-speed DMA transfer operation for data having various counter values.

Figure 1:
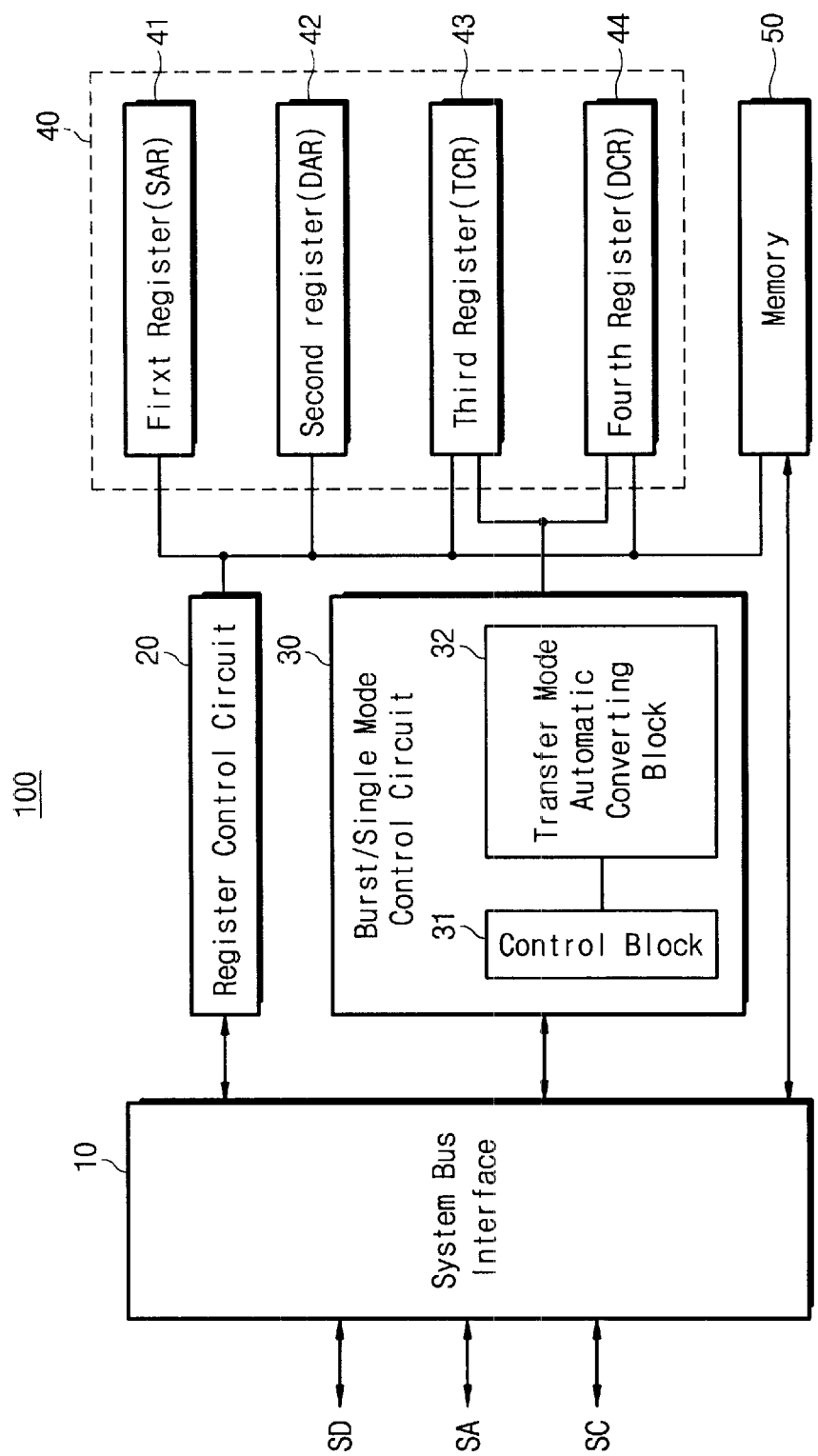
FIG. 1 is a block diagram illustrating the architecture of a direct memory access controller in accordance with the present invention.

FIG. 1 is a block diagram illustrating the DMA controller 100 in accordance with the present invention. Referring to FIG. 1, the DMA controller 100 is composed of a system bus interface 10, a register control circuit 20, a burst/single mode control circuit 30, a register 40, and memory 50. The system bus interface 10 performs an interface with a CPU (not shown), and receives information for an address of an input/output device (not shown), an address for writing/reading data from the memory 50, and the length of data to be written in/read out therefrom.

The register control circuit 20 receives the data through the system bus interface 10, and loads the received data on a proper portion of the register 40. Here, the register 40 is composed of first to fourth registers 41–44. The first register 41 acts as a source address register SAR storing the address of the input/output device, the second register 42 as a destination address register DAR storing an initial address for writing/reading data from the memory 50. The third register 43 acts as a transfer counter register TCR storing a transfer counter value of data to be written in/read out therefrom (i.e. information of the number of words to be written in/read out therefrom), and the fourth register 44 as a DMA control register DCR storing control signals for DMA transfer operation.

The burst/single mode control circuit 30 is composed of a control unit 31 and a transfer mode automatic converting unit 32. The burst/single mode control circuit 30 automatically converts the DMA transfer operation mode to the burst or single mode, and carries out the DMA transfer operation. Conversion of the DMA transfer operation mode by the burst/single mode control circuit 30 is operable with data having any counter value, and is not limit to a specific data counter value.

For example, a burst mode operation of the conventional DMA controller is only carried out in the case where the data transfer counter value is evenly divisible by the burst length. However, assuming the data transfer counter value is not evenly divisible by the burst length, the DMA controller 100 of the present invention performs the burst mode operation to the extent that this is possible, and then transmits any remaining data according to the single mode. These mode converting processes are automatically performed in the transfer mode automatic converting unit 32 in response to a transfer counter value TCRV of data stored in the third and fourth registers 43 and 44 and control signal DCRV for DMA transfer operation. After the DMA transfer operation is completed, an interrupt signal TREI for informing the complete DMA transfer operation is provided to the CPU (not shown) through the control unit 31. The detailed burst/single mode control circuit 30 is as follows.

Figure 2:
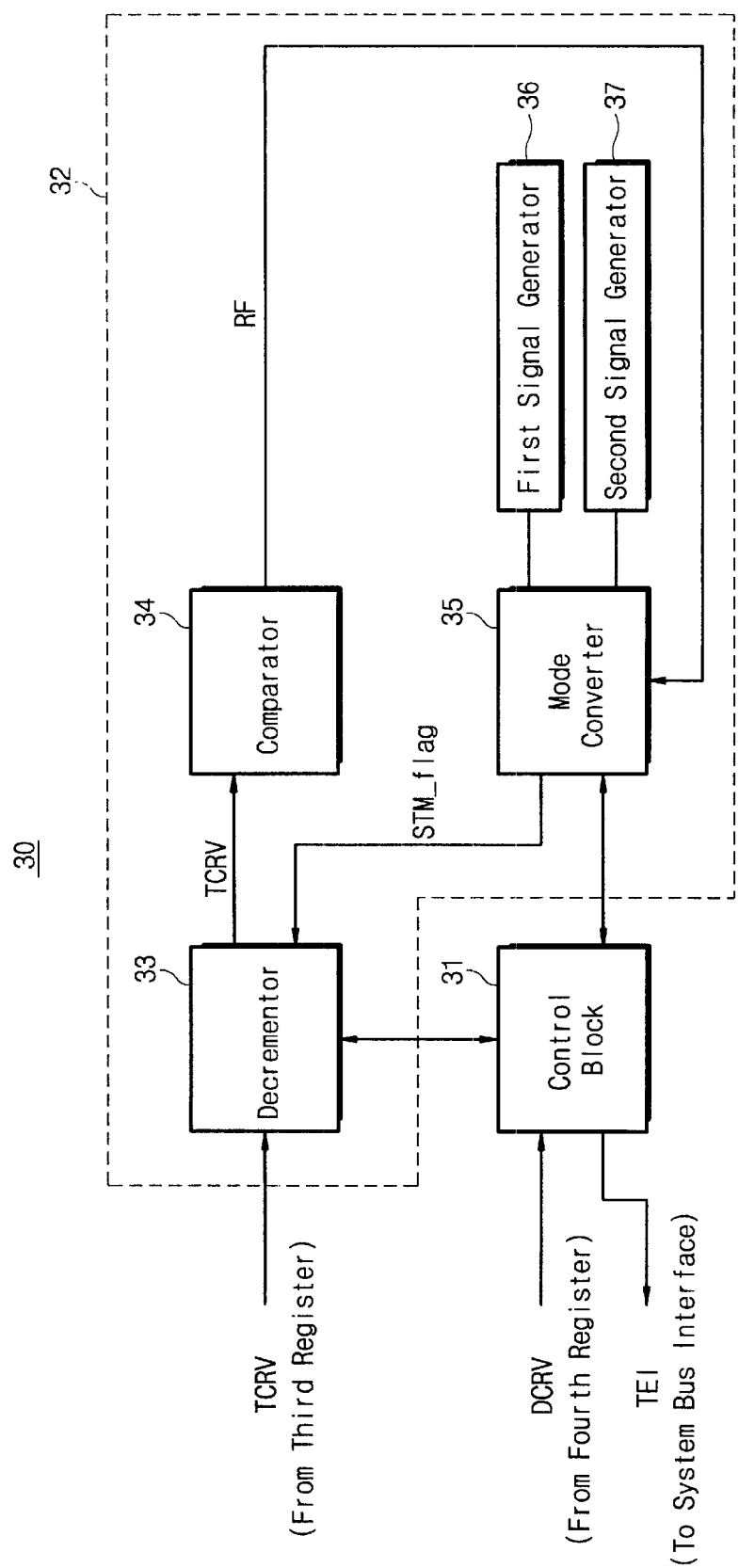
FIG. 2 is a block diagram illustrating a detailed architecture of the burst/single mode control circuit in FIG. 1.

FIG. 2 is a block diagram illustrating, in detail, the burst/single mode control circuit 30 of FIG. 1. Referring to FIG. 2, the burst/single mode control circuit 30 is composed of a transfer mode automatic converting unit 32, a decrementor 33, a comparator 34, a mode converter 35, and first and second signal generators 36 and 37.

The control unit 31 converts the DMA transfer operation mode performed in the burst/single mode control circuit 30 in response to the control signal DCRV stored in the fourth register 44, and controls the DMA transfer operation.

In the decrementor 33, a transfer counter value TCRV of data stored in the third register 43 is stored as an initial value, and whenever DMA transfer operation by the burst mode or the single mode is carried out, the stored value is decreased by a predetermined value by the control unit 31. For example, when the burst length is established as '8', the data transfer counter value TCRV stored in the decrementor 33 is decreased by '8' in accordance with each transfer operation of the burst mode DMA, and is decreased by '1' for each transfer operation of the single mode DMA. The TCRV, decreased by a predetermined value by the decrementor 33, is provided to the comparator 34.

The comparator 34 receives the TCRV from the decrementor 33, and determines whether the TCR can be evenly divided by the burst length. The comparator 34 provides to the mode converter 35 a flag value Rf for converting the DMA transfer operation mode to the burst mode or single mode. If the TCRV is divided by the burst length, the flag value Rf is output as '0' (or 1), and thereby the DMA controller 100 transmits data to the burst mode, and if not, the Rf is output as '1'(or 0), and thereby the DMA controller 100 transmits data to the single mode. There are various methods to embody the circuit having the above function. For the sake of convenience, a 24-bit comparator is used in the present invention. Three least significant bits LBS (e.g. b2, b1, and b0), among a large number of bits composing the data transfer counter value TCRV, operate as the most important bits to convert a transfer operation mode in accordance with the TCRV. For example, if the TCRV is evenly divided by the burst length, at least more one bit, among the bits except the three LSBs b2, b1, and b0, will have a value of '1'. On the contrary, if the TCRV is not evenly divided by the burst length without a remainder, the each bit except the three LSBs b2, b1, and b0 will have a value of '0'. For the latter case, the LSBs b2, b1, and b0 represent a remainder (e.g. 0 to 7) that means the data length value TCRV is not to be divided by the burst length.

If the three LSBs b2, b1, and b0 are all 0 and the higher bits except the b2, b1, and b0 are also 0, the data transfer counter value becomes '0' and the DMA transfer operation does not proceed any further.

As a result of the comparator 34, if at least one more bit among the bits, except the three LSBs b2, b1, and b0, has '1', the data transfer counter value can be completely divided by the burst length. Thus, the flag value Rf is output as a '0' (or 1). On the other hand, if each preceding bit beyond the b2, b1, and b0 bits is '0', and if all bits b2, b1, and b0 are not '0', then the TCRV is not completely divisible by the burst length, and thus have a remainder. As a result, the Rf is output as a '1'(or 0).

The first signal generator 36 generates a control signal for the burst mode DMA transfer operation, and the second signal generator 37 generates a control signal for the single mode DMA transfer operation. The first and second signal generators 36 and 37 are alternatively enabled by a control signal of the mode converter 35 receiving the Rf signal from the comparator 34. For example, when the Rf signal set at '0'(or 1) representing the burst mode is generated by the comparator 34, the first signal generator 36 is enabled by the mode converter 35, and generates a control signal for the burst mode DMA transfer operation. Further, when the Rf having set at '1'(or 0) representing the single mode is generated, the second signal generator 37 is enabled by the mode converter 35, and generates a control signal for the single mode DMA transfer operation. The mode converter 35 provides to the decrementor 33 a selected transfer operation mode flag signal STMf informing the type of DMA transfer operation mode being current carried out. The mode converter 35 may comprise, for example, a multiplexer.

The decrementor 33, by the selected transfer operation mode flag signal STMf from the mode converter 35 and control signal of the control unit 31, decreases a predetermined value (e.g. burst length in the burst mode or '1' in the single mode) from the data transfer counter value TCRV in accordance with the current DMA transfer operation mode. When the TCRV decreased by the decrementor 33 becomes '0', the control unit 31 provides an interrupt signal TEI informing an end of the DMA transfer operation to the CPU (not shown) via the system bus interface 10.

The burst/single mode control circuit 30 automatically establishes the burst mode and/or the single mode without limit of the TCRV. While the number of transfer operation times of the burst mode DMA automatically carried out by the burst/single mode control circuit 30 is a quotient of the TCRV being dividing by the burst length, the number of transfer operation times of the single mode DMA automatically carried out by the burst/single mode control circuit 30 after the burst mode DMA transfer operation is the remainder of the TCRV being divided by the burst length. DMA transfer operation speed by the DMA controller 100 for flexibly converting transfer operation mode in accordance with data transfer counter value is remarkably improved as comparing with the conventional transfer methods. The DMA controller 100 of the present invention is not only applicable to all types of DMA controllers operable in burst mode, but also to high quality devices such as universal serial bus USB, Memory-to-Memory, System On a Chip, and the like.

A comparison of the operation and performance of the DMA controller 100 of the present invention will now be provided with respect to the conventional DMA controller.

Figure 3:
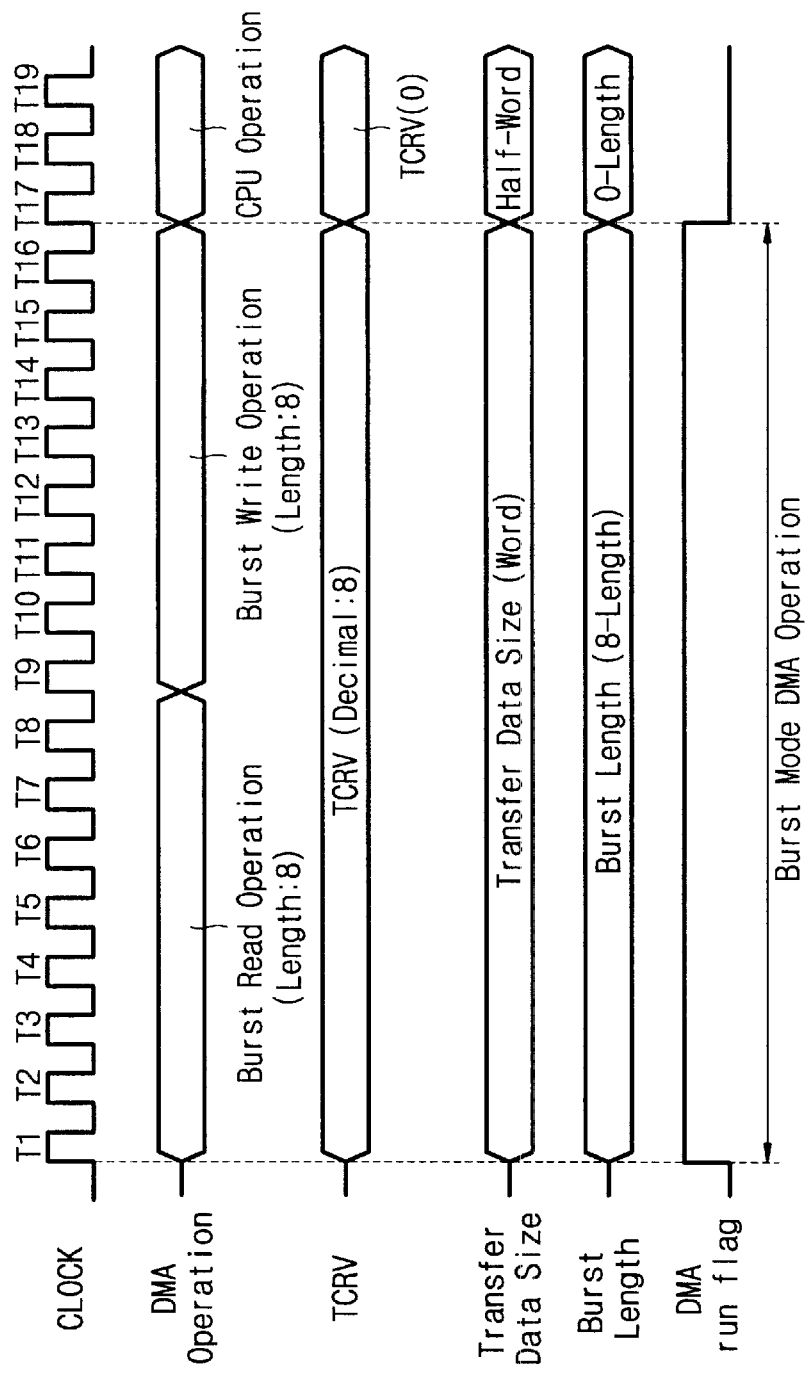
FIGS. 3 and 4 are timing diagrams illustrating a direct memory access (DMA) transfer operation time of a conventional DMA controller.

FIG. 3 is a timing diagram illustrating the conventional burst mode DMA transfer operation in the case that the data transfer counter value TCRV divides evenly by the burst length. The conventional DMA controller associated simply carries out the burst mode DMA transfer operation in response to the TCRV as the burst length. The conventional DMA controller can perform the burst mode DMA transfer operation only when the data transfer counter value TCRV is divided evenly by the burst length. For example, in the case that the TCRV is '10' and the burst length is '8', the TCRV is not evenly divisible by the burst length, therefore data corresponding to the remainder 2 cannot be transmitted by the burst mode.

Figure 4:
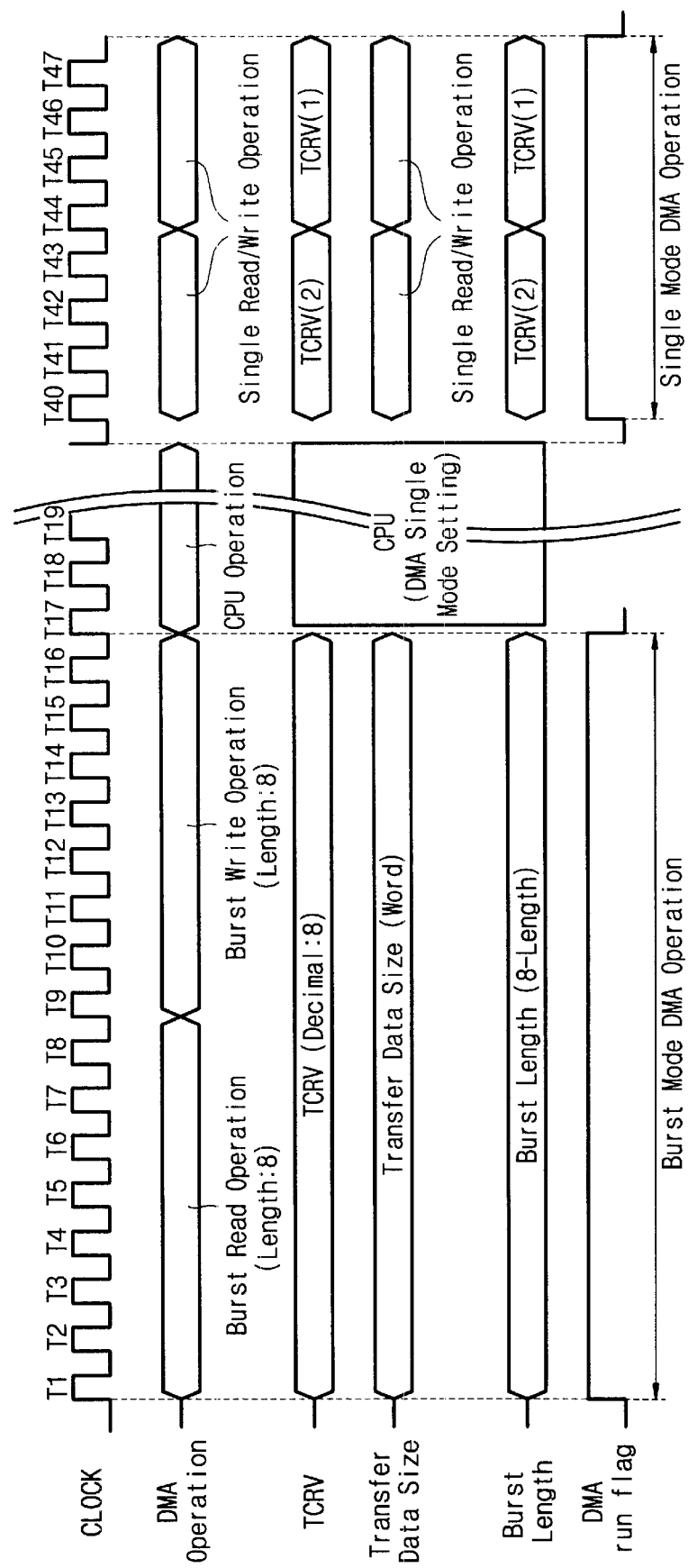

FIG. 4 is a timing diagram showing the burst and single mode DMA transfer operations when the TCRV is not evenly divisible by the burst length. For example, if the TCRV is '10' and the burst length is '8', the conventional DMA controller first performs one time the burst mode DMA transfer operation, and performs two times the single mode DMA transfer operation after the CPU sets the single mode. Generally, the conventional DMA controller can perform only the burst mode DMA transfer operation corresponding to the burst length of '8'. Thus, transfer operation mode converting from the burst mode to the single mode is required so as to transmit the TCRV of '2'. However, this transfer of modes requires a control operation by the CPU, and thereby the DMA transfer operation is delayed. In addition to that, the converting to the single mode needs to calculate the TCRV is required in advance by a programmer.

Figure 5:
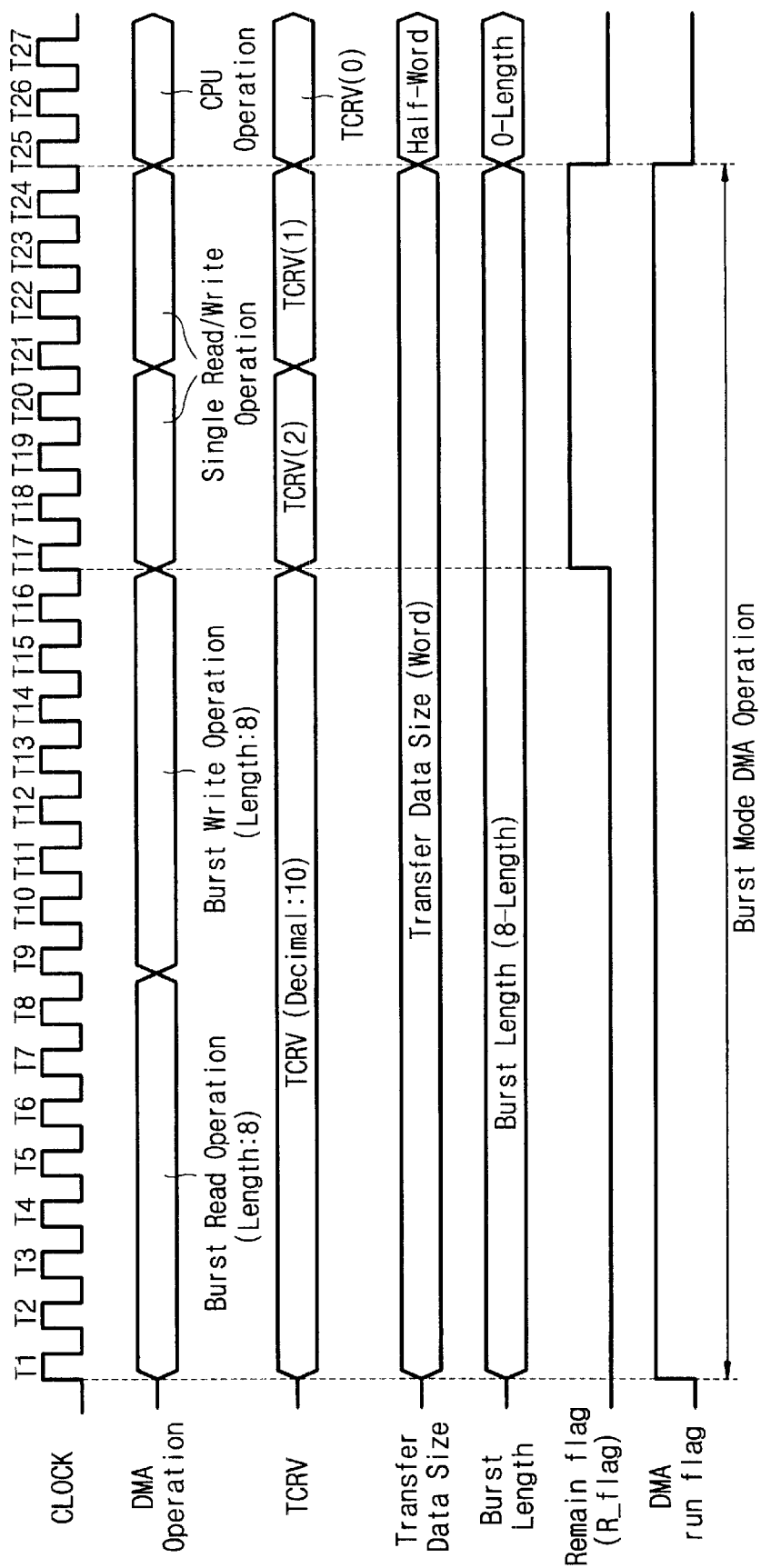
FIG. 5 is a timing diagram illustrating the DMA transfer time of a DMA controller in accordance with the present invention.

FIG. 5 is a timing diagram showing the DMA transfer operation of the present invention when the TCRV is not evenly divisible by the burst length. In the DMA transfer method of the present invention, an additional control operation by the CPU is not required. This is because the transfer operation mode is automatically converted from the burst mode to the single mode without control operation of the CPU, and data is successively transmitted. Further, the DMA controller of the present invention can convert, with flexibility, the transfer operation mode without limit of data length. Thus, the data transfer counter value does not need to be calculated in advance by a programmer.

While circuit architecture and operation are described as the above description and drawings, it should be understood that other variations of the preferred embodiment are within the scope of this invention.

According to the present invention, the DMA transfer operation mode can be converted from the burst mode to the single mode regardless of the data transfer counter value, and carried out an optimum high-speed DMA transfer operation for data having various counter values.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A direct memory access controller (DMA) for converting a DMA transfer operation mode in accordance with a data transfer counter value, wherein the direct memory access controller performs data transfer operations between a memory and an input/output device without control operation by a central processing unit (CPU), comprising:

a system bus interface for interfacing the CPU with an address of the input/output device, an address for writing/reading data from the memory, the transfer counter value of data to be written in/read out therefrom, and a control signal for a DMA transfer operation;

a first register for storing said address of the input/output device;

a second register for storing said initial address for writing/reading data from the memory;

a third register for storing said data transfer counter value;

a fourth register for storing said control signal;

a register control circuit for loading the addresses, the data transfer counter value, and the control signal from said system bus interface on a proper position of the first to fourth registers; and a burst/single mode control circuit for receiving said data transfer counter value and said control signal from the third and fourth registers, for automatically converting the DMA transfer operation mode between a burst mode or a single mode, and performing the DMA transfer operation in accordance with the converted DMA transfer operation mode.

2. The DMA controller of claim 1, wherein said burst/single mode control circuit performs the burst mode DMA transfer operation a number of times corresponding to a quotient of the data transfer counter value divided by the burst length, and also performs the single mode DMA transfer operation a number of times corresponding to a remainder of the division.

3. The DMA controller of claim 2, wherein said burst mode DMA transfer operation and said single mode DMA transfer operation are successively operated without control operation by the CPU.

4. The DMA controller of claim 1, wherein said burst/single mode control circuit includes:

a control unit for converting the DMA transfer operation mode in response to the control signal stored in the fourth register, and for controlling the DMA transfer operation;

a decrementor for receiving the data transfer counter value stored in the third register, and for decreasing the data transfer counter value when the burst mode or the single mode DMA transfer operation is carried out;

a comparator for determining the DMA transfer operation mode by the value of lower bits comprising at least one predetermined bit among a plurality of bits of the data transfer counter value, and by the value of higher bit comprising bits of the data transfer counter value other than the lower bits;

a first signal generator for generating a control signal for the burst mode DMA transfer operation;

a second signal generator for generating a control signal for the single mode DMA transfer operation; and a mode converter for performing the DMA transfer operation by enabling one of the first and second signal generators in response to the DMA transfer operation mode determined by the comparator, and for providing information of the current DMA transfer operation mode to the decrementor.

5. The DMA controller of claim 4, wherein said decrementor, in response to the information of the DMA transfer operation mode, decreases the data transfer counter value by the burst length if the DMA transfer operation mode is the burst mode, and decreases the data transfer counter value by '1' if the DMA transfer operation mode is the single mode.

6. The DMA controller of claim 4, wherein said the comparator determines the DMA transfer operation mode to the burst mode if at least more one bit has '1' among the higher bits.

7. The DMA controller of claim 4, wherein said the comparator determines the DMA transfer operation mode to be the single mode if all of the higher bits are '0' and at least more than one bit among the lower bits is '1'.

8. The DMA controller of claim 4, wherein said the control unit provides an interrupt signal to the system bus interface if the data transfer counter value decreased by the decrementor is '0'.

* * * * *